United States Patent
Saylor et al.

(10) Patent No.: US 9,166,986 B1
(45) Date of Patent: Oct. 20, 2015

(54) WITNESSING DOCUMENTS

(71) Applicant: MicroStrategy Incorporated, Vienna, VA (US)

(72) Inventors: Michael J. Saylor, Vienna, VA (US); Hector Vazquez, Ashburn, VA (US); Peng Xiao, McLean, VA (US); Andrew T. Foy, Arlington, VA (US)

(73) Assignee: MicroStrategy Incorporated, Vienna, VA (US)

( * ) Notice: Subject to any disclaimer, the term of this patent is extended or adjusted under 35 U.S.C. 154(b) by 39 days.

(21) Appl. No.: 13/941,621

(22) Filed: Jul. 15, 2013

Related U.S. Application Data

(60) Provisional application No. 61/731,834, filed on Nov. 30, 2012.

(51) Int. Cl.
*G06F 21/64* (2013.01)
*H04L 29/06* (2006.01)

(52) U.S. Cl.
CPC ............ *H04L 63/123* (2013.01); *G06F 21/645* (2013.01)

(58) Field of Classification Search
None
See application file for complete search history.

(56) References Cited

U.S. PATENT DOCUMENTS

| | | | | |
|---|---|---|---|---|
| 2002/0019937 A1* | 2/2002 | Edstrom et al. | | 713/168 |
| 2002/0143704 A1* | 10/2002 | Nassiri | | 705/51 |
| 2003/0023851 A1* | 1/2003 | Peha | | 713/176 |
| 2009/0006842 A1* | 1/2009 | Ross et al. | | 713/155 |
| 2009/0049298 A1* | 2/2009 | Hatter et al. | | 713/176 |
| 2012/0166309 A1* | 6/2012 | Hwang et al. | | 705/26.41 |

OTHER PUBLICATIONS

Wikipedia, "Certificate authority," Wikipedia [online] Aug. 8, 2012 [retrieved on Aug. 15, 2012]. Retrieved from the Internet: <URL: http://en.wikipedia.org/wiki/Certificate_authority>, 4 pages.

Wikipedia, "Certificate signing request," Wikipedia [online] Aug. 20, 2013 [retrieved on Aug. 24, 2012]. Retrieved from the Internet: <URL: http://en.wikipedia.org/wiki/Certificate_signing_request>, 4 pages.

Wikipedia, "Cryptographic hash function," Wikipedia [online] Aug. 8, 2012 [retrieved on Aug. 15, 2012]. Retrieved from the Internet: <URL: http://en.wikipedia.org/wiki/Cryptographic_hash_function>, 5 pages.

Wikipedia, "Digital signature," Wikipedia [online] Aug. 14, 2012 [retrieved on Aug. 15, 2012]. Retrieved from the Internet: <URL: http://en.wikipedia.org/wiki/Digital_signature>, 10 pages.

(Continued)

*Primary Examiner* — David Pearson
(74) *Attorney, Agent, or Firm* — Fish & Richardson P.C.

(57) ABSTRACT

A server receives, from a first client device associated with a first user, a certification request including information associated with an electronic document, along with a representation of a credential associated with a second user. The server validates the representation of the credential associated with the second user. Responsive to validating the representation of the credential, the server attaches a badge to the electronic document, the badge corresponding to the credential and providing a certification that the second user has witnessed the electronic document. The server stores information corresponding to the electronic document with the attached badge.

22 Claims, 6 Drawing Sheets

(56) References Cited

OTHER PUBLICATIONS

Wikipedia, "ID-based encryption," Wikipedia [online] Jul. 27, 2012 [retrieved on Aug. 15, 2012]. Retrieved from the Internet: <URL: http://en.wikipedia.org/wiki/Identity_based_encryption>, 5 pages.
Wikipedia, "Message authentication code," Wikipedia [online] Aug. 8, 2012 [retrieved on Aug. 15, 2012]. Retrieved from the Internet: <URL: http://en.wikipedia.org/wiki/Message_authentication_codes>, 4 pages.
Wikipedia, "Multi-factor authentication," Wikipedia [online] Aug. 6, 2012 [retrieved on Aug. 15, 2012]. Retrieved from the Internet: <URL: http://en.wikipedia.org/wiki/Multi-factor_authentication>, 3 pages.
Wikipedia, "Public key certificate," Wikipedia [online] Aug. 12, 2012 [retrieved on Aug. 15, 2012]. Retrieved from the Internet: <URL: http://en.wikipedia.org/wiki/Digital_certificates>, 7 pages.
Wikipedia, "Public-key cryptography," Wikipedia [online] Aug. 15, 2012 [retrieved on Aug. 15, 2012]. Retrieved from the Internet: <URL: http://en.wikipedia.org/wiki/Public-key_cryptography>, 12 pages.
Wikipedia, "Public-key infrastructure," Wikipedia [online] Aug. 8, 2012 [retrieved on Aug. 15, 2012]. Retrieved from the Internet: <URL: http://en.wikipedia.org/wiki/Public_Key_Infrastructure>, 6 pages.
Wikipedia, "SecureID," Wikipedia [online] Jul. 5, 2012 [retrieved on Aug. 15, 2012]. Retrieved from the Internet: <URL: http://en.wikipedia_org/wiki/SecurID>, 5 pages.
Wikipedia, "Two-factor authentication," Wikipedia [online] Aug. 13, 2012 [retrieved on May 15, 2012]. Retrieved from the Internet: <URL: http://en.wikipedia.org/wiki/Two-factor_authentication>, 15 pages.

* cited by examiner

WITNESSING DOCUMENTS

CROSS REFERENCE TO RELATED APPLICATIONS

This application claims the benefit of the priority of U.S. Provisional Application Ser. No. 61/731,834, filed Nov. 30, 2012 and entitled "Witnessing Documents", which is incorporated herein by reference in its entirety.

TECHNICAL FIELD

This disclosure generally relates to electronic document witnessing.

BACKGROUND

A server may be used to store files that are associated with user accounts. Users may access the files using applications running on their respective client devices.

SUMMARY

An electronic document may be witnessed, for example, using credentials that are available on client devices. The credentials may be generated and/or managed by a server application running on a server and communicated from the server to a client application executed on the client devices.

In one aspect, a server receives, from a first client device associated with a first user, a certification request including information associated with an electronic document, along with a representation of a credential associated with a second user. The server validates the representation of the credential associated with the second user. Responsive to validating the representation of the credential, the server attaches a badge to the electronic document, the badge corresponding to the credential and providing a certification that the second user has witnessed the electronic document. The server stores information corresponding to the electronic document with the attached badge.

Implementations may include one or more of the following. Receiving the certification request may comprise receiving, at the server and from the first client device, a copy of the electronic document for uploading to the server.

The electronic document may be stored at the server prior to receiving the certification request. The server may store the electronic document on behalf of the first user. The server may receive, from the first client device, an access request on behalf of the first user for accessing the electronic document. Responsive to receiving the access request, the server may transmit a copy of the electronic document to the first client device.

The representation of the credential may be one of an optical machine-readable representation, an alphanumeric string, a phrase or a sonic code. Validating the representation of the credential may comprise the server identifying the second user based on the representation of the credential. The server may determine whether the representation of the credential matches information stored at the server associated with the second user. Based on determining that the representation of the credential matches information stored at the server associated with the second user, the server may transmit a query to a second client device associated with the second user, the query seeking verification from the second user for certifying the electronic document. The server may receive, from the second client device, a response to the query. The server may determine whether the response provides verification from the second user for certifying the electronic document. Based on determining that the response provides verification from the second user for certifying the electronic document, the server may attach the badge to the electronic document.

Validating the representation of the credential may comprise determining, by the server, whether the credential provides authorization to the second user for certifying the electronic document as a witness. Storing information corresponding to the electronic document with the attached badge may comprise the server storing the electronic document with the attached badge in association with at least one of an identifier for the electronic document, an identifier for the first user, an identifier for the second user, and the representation of the credential. Storing information corresponding to the electronic document with the attached badge may comprise the server generating a message digest by hashing the document with the attached badge. The server may store the message digest.

The server may receive a request from a third client device for confirming integrity of the electronic document, the request including a first message digest of the electronic document with the attached badge. The server may determine whether the first message digest is a match with a second message digest of the electronic document with the attached badge, the second message digest generated by the server. Based on determining that the first message digest is a match with the second message digest, the server may transmit a confirmation message to the third client device, the confirmation message confirming the integrity of the electronic document.

The second message digest may be generated by the server responsive to receiving the request from the third client device. Confirming the integrity of the electronic document may include confirming that the second user has witnessed the electronic document. The third client device may be configured for receiving the electronic document with the attached badge from the first client device.

The server may receive a request from a third client device for confirming integrity of the electronic document, the request including information associated with the electronic document and the representation of the credential. The server may identify the badge attached to the electronic document based on the information included in the request from the third client device. The server may transmit the electronic document along with the attached badge to the third client device. Confirming the integrity of the electronic document may include confirming that the second user has witnessed the electronic document.

Receiving the certification request from the first client device associated with the first user may comprise displaying, by the first client device and on a first user interface running on the first client device, the electronic document. Responsive to displaying the electronic document on the first user interface, the first client device may receive the representation of the credential from a second client device associated with the second user.

Receiving the representation of the credential from the second client device may comprise receiving the representation of the credential through a user input on the first client device based on the representation of the credential being displayed on a second user interface running on the second client device. Alternatively, receiving the representation of the credential from the second client device may comprise scanning, by the first client device, the representation of the credential based on the representation of the credential being displayed on the second user interface. Alternatively, receiving the representation of the credential from the second client device may comprise receiving, by the first client device and from the second client device, a network transmission including the representation of the credential. The network transmission may be one of an ultrasonic transmission, a near field communication (NFC) transmission or a wireless fidelity (Wi-Fi) transmission.

In another aspect, a server stores an electronic document associated with an account of a first user. The server receives, from a first client device associated with the first user, an access request for accessing the electronic document. Responsive to receiving the access request, the server determines whether the first client device is associated with the account of the first user. Based on determining that the first client device is associated with the account of the first user, the server transmits the electronic document to the first client device. The server receives, from the first client device, a certification request for certifying the electronic document as witnessed by a second user, the certification request including a representation of a credential associated with the second user. The server determines whether the representation of the credential is associated with an account of the second user. Based on determining that the representation of the credential is associated with the account of the second user, the server attaches a badge to the electronic document, the badge corresponding to the credential and providing a certification that the second user has witnessed the electronic document. The server stores information corresponding to the electronic document with the attached badge.

Implementations of the above techniques include a method, a computer program product and a system. The computer program product is suitably embodied in a non-transitory machine-readable medium and includes instructions executable by one or more processors. The instructions are configured to cause the one or more processors to perform the above described actions.

The system includes one or more processors and instructions embedded in a non-transitory machine-readable medium that are executable by the one or more processors. The instructions, when executed, are configured to cause the one or more processors to perform the above described actions.

The details of one or more aspects of the subject matter described in this specification are set forth in the accompanying drawings and the description, below. Other potential features will be apparent from the description and drawings, and from the claims.

DETAILED DESCRIPTION

Figure 1:
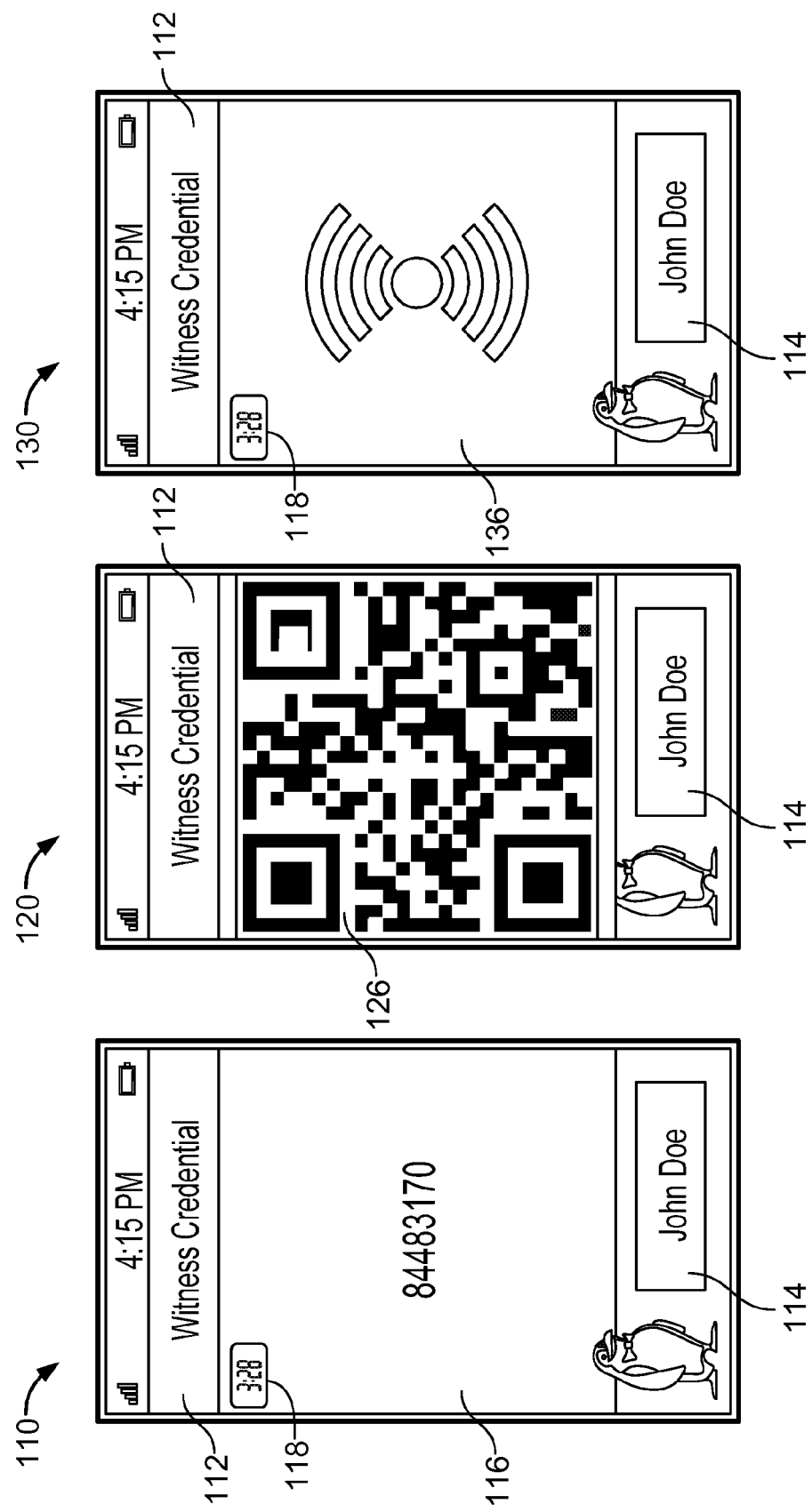
FIG. 1 illustrates examples of pages showing witness credentials that are presented on the display of a client device.

Services such as witnessing physical documents may be performed by persons such as a notary. A notary can review a physical version of the document, and/or the act of signing the document, and then certify that the document, and/or the act of signing the document, was witnessed by the notary. Typically, the certification is in the form of a notary seal or badge that is imprinted on the physical version of the document, along with a signature of the notary person.

Similar services for notarizing or witnessing electronic documents, in which a physical version of the document may not be readily available, may be challenging. In some instances, notarizing or witnessing of electronic documents may be achieved using a client-server system in which client devices communicate with a central computer server in the backend.

In this context, an electronic document is a software file (or multiple related software files) that includes data and can be stored in electronic form in tangible storage media, such as computer memory or hard drives. Generally, the electronic document may be a textual document, though other electronic formats may be possible, such as a graphical document, an audio file, a video file or a multimedia file.

Evidence of the certification of an electronic document may be in the form of a badge that is embedded on to the electronic copy of the document (for example, a badge that is appended as an overlay to a representation of the electronic document). The badge may be uniquely tied to the identity of the person witnessing the document and readily verifiable as being uniquely tied to the identity of the person witnessing the document. For example, the badge may be based on a credential linked to the identity of the person witnessing the document. In some implementations, the document witnessing may be performed only by persons who are authorized by a central authority, such as a credential authority, to perform such functions. In such implementations, the credentials may be linked specifically to the document witnessing functionality. The badge also may encode information pertaining to the authorization granted for performing the witness function.

As described in greater detail in the following sections, a client-server system for witnessing electronic documents may be implemented by a server application running on a centralized server that manages credentials for users. The server may be configured for creating and managing user accounts, and generating and managing credentials that are tied to the user accounts. The server also may be configured for managing the witnessing of electronic documents and storing electronic documents that are certified as having been witnessed, along with the associated badges.

The users may communicate with the server using instances of a client software application running on the client devices of the users. The client software application may be used to upload electronic documents to the server, which the server associates with user accounts corresponding to the owners of the electronic documents.

The users may download credentials from the server on to their respective client devices using the client software application, use the credentials for certifying that they have witnessed electronic documents that are presented to them, and then the certified electronic documents may be uploaded to the server through the client software application. Alternatively, the users may send instructions to the server to certify, on their behalf, documents that they have witnessed, with the documents being already available locally at the server, or uploaded to the server by the users.

Systems that generate, distribute, and process credentials for electronic document witnessing are described in the following sections. For the purposes of this discussion, in the following, a person witnessing an electronic document is referred to as a witness. The person who controls the electronic document that is witnessed is referred to interchangeably as document creator or document owner. The terms badge and certificate are used synonymously, as are the terms server and server application, and the terms client software application, software application and client device. The functionality of witnessing a document is meant to include the functionality of certifying that a document has been witnessed, and the terms witnessing a document and certifying a document are used synonymously. A document that has been certified as witnessed is referred to interchangeably as a witnessed electronic document or a certified electronic document.

FIG. 1 illustrates examples of pages 110, 120, and 130 showing witness credentials that are presented on the display of a client device. The pages 110, 120, and 130 are presented by a graphical user interface (GUI) of the client software application that is executed on the client device. The client device may be, for example, the computing device used by a person who witnesses electronic documents and certifies them as having been witnessed using credentials associated with the person. The software application may be implemented as a set of instructions that are stored in some tangible storage medium associated with the client device, such as a magnetic hard drive, read-only memory (ROM) or random access memory (RAM) that is included in, or coupled to, the client device. The set of instructions may be executed by a processor associated with the client device for generating the GUI with the pages 110, 120, and 130 and enabling communication with the server.

Each of the pages 110, 120, and 130 includes a page title 112 identifying the content of the page. Each page also includes a username 114 and a representation of a credential such as 116, 126 or 136. In addition, page 130 includes a timer, such as 118.

In this context, a credential may be taken to refer to an evidence of rights or entitlement to privileges that can be, for example, a token that may be used to prove identity to the server or to prove authorization to witness an electronic document, share or access a file, a badge to gain entrance to a location, an identifier for membership in a group (for example, a graduate of a school or a professional certification), a ticket for entry to an event, a redeemable voucher, a key that unlocks a lock (for example, for entry to a location), etc.

Credentials can be represented in various forms, some of which are shown on the pages 110, 120, and 130. In some implementations, a credential may be a numeric value, for example, as shown by 116 on the page 110. In some implementations, a credential may be an alphanumeric value, of which the credential 116 may be one example. For example, a credential may be one of a binary, decimal, octal or hexadecimal value, a string of letters and digits or some other suitable representation.

In some implementations, a credential may be time-sensitive. Associated with each credential may be a validity time period during which the credential is valid (for example, to validate identity, witness documents, or for some other suitable function). A transaction that is attempted with a credential outside its validity time period may be rejected as associated with an invalid credential. Accordingly, page 110 includes a timer 118 indicating the time remaining in the validity time period of the credential 116. As shown by the example, the credential 116 will expire in 3 minutes and 28 seconds.

In some implementations, a credential may be represented by an optical machine-readable representation, such as a bar code or a quick response (QR) code. For example, page 120 shows a credential 126 that is represented by a QR code. The credential 126, or some other suitable optical machine-readable representation, may be an arrangement of graphical elements that encode alphanumeric data, where the elements are arranged so that the data can be read by an optical scanner. In some implementations, the optical machine-readable representations may encode credential identifiers and user identifiers. In other implementations, the optical machine-readable representations may encode other identifiers that are linked to or otherwise associated with credential identifiers and/or user identifiers.

In some implementations, a credential may be represented by sound waves (for example, ultrasonic sound waves). For example, the credential may be represented by an audio clip that is transferred from one client device by transmission through speakers coupled to the client device. The page 130 shows an indicator 136 that the client device is outputting a representation of a credential (for example, a numeric value) as an audio signal from a speaker of the client device. The audio signal may be transferred from the client device to another client device using ultrasonic sound waves. The display 130 also includes the timer 118 indicating the time remaining until the numeric representation for the credential expires (for example, 3 minutes and 28 seconds).

In addition to displaying the representations of the credentials, each page 110, 120, or 130 includes a title 112 that identifies the page as displaying a credential that may be used for certifying electronic documents. Each page 110, 120, or 130 also includes a username 114 that identifies the user corresponding to the user account with which the credentials 116, 126 and 136 are associated.

In some implementations, the client device on which the pages 110, 120, and 130 are displayed may be a mobile device, such as a smartphone, a tablet computer or a music player. In such implementations, the software application may be a mobile application, and the pages 110, 120, and 130 may be suitably formatted for presentation on the display of the mobile device. In other implementations, the client device may be a desktop or laptop computer. In some such implementations, the software application may be a conventional software application, and the pages 110, 120, and 130 may be suitably formatted for presentation on the display of the desktop or laptop computer.

In some implementations, the representation of the credential 116, 126 or 136 may be generated by the server based on a request from the client device used by the witness. For example, the witness may launch the client software application on his/her client device and send a request for a credential to the server from the software application. Alternatively, upon launching the client software application, a request may be automatically sent from the client device to the server.

Based on the request from the witness client device, the server may generate a representation of a credential that is to be used for document witnessing. The generated credential representation is linked to the user account at the server for the witness, and the user account may be identified based on the credential. The user account may include a badge that is associated with the witness. When an electronic document is witnessed, the badge may be embedded on to (or otherwise associated with) the electronic document as proof of the certification.

Upon generating the representation of the credential, the server transmits the representation of the credential to the witness device. The software application on the witness client device may then present the representation of the credential on the display of the device using the GUI of the software application, as shown in pages 110, 120, and 130.

In some implementations, the software application on the client device of the witness may be configured to present different types of representations of the same credential, such as any of 116, 126 and 136. In such implementations, the client device may request the specific type of credential representation while sending the request for the credential representation to the server. The request from the client device may be based on a preference that is entered by the witness on the client device.

However, in some other implementations, the software application on the witness client device may be configured to present credential representations of a specific type, such as one of 116, 126 or 136. In such implementations, the witness may not be asked to select the type of credential representation requested. Instead, the specific type of the credential representation may be preconfigured in the software application and automatically sent to the server while sending the request for the credential representation.

In some implementations, the credential representation 116, 126 or 136 (or data and/or logic sufficient to enable generation of the credential representation) may be previously stored in association with the software application executed on the client device used by the witness. In such implementations, when the witness launches the client software application on his/her client device, the credential representation may be retrieved from local storage of the client device and presented on the display of the device using the GUI of the software application. In such cases, a request for a credential representation may not be sent to the server from the software application.

Once a credential representation is available to the witness client device, the witness may transfer the credential representation to the client device of the document owner. In some implementations, the software application itself may provide an in-built option to transfer the credential to an instance of the software application running on the client device of the document owner. In other implementations, the witness can transfer the credential to the document owner using a mechanism that is distinct from the software application. For example, the witness may transmit the credential by email or short message service (SMS). In some instances, the witness may simply read out the credential to the document owner, or the document owner may see the credential on the witness' client device, for example, when the witness and the document owner are in close physical proximity. In such implementations, the document owner may enter the witness credential representation on his or her client device by typing in the alphanumeric credential, or scanning the QR code, or receive the credential by ultrasonic transmission or near-field communications (NFC).

Figure 2:
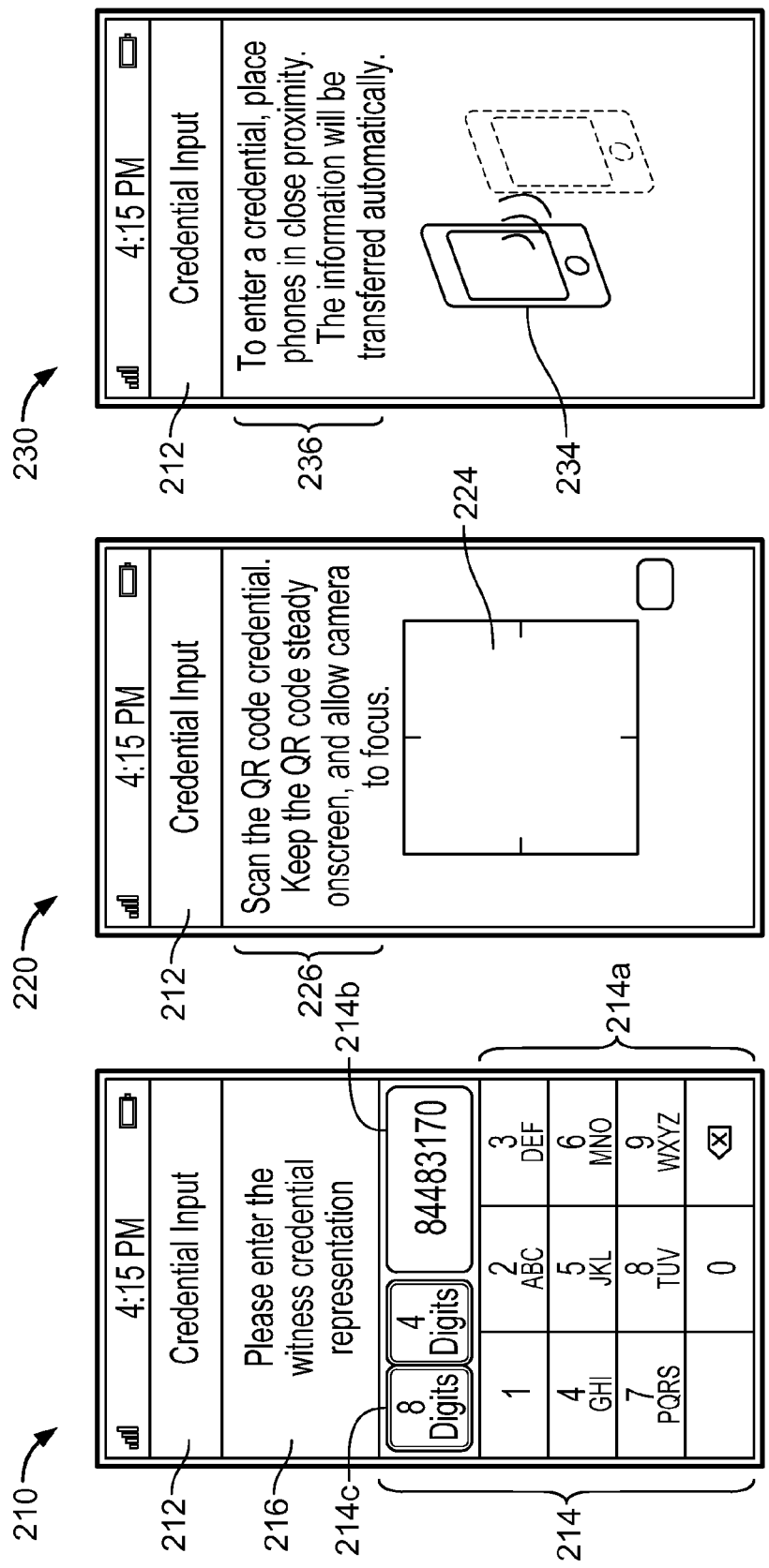
FIG. 2 illustrates examples of pages showing mechanisms for receiving a witness credential on a client device.

FIG. 2 illustrates examples of pages 210, 220 and 230 showing mechanisms for receiving a representation of a witness credential on a client device. The pages 210, 220 and 230 may be presented on the display of the client device by the GUI of the client software application that is executed on the client device, which may be, for example, the computing device used by a document owner who receives a witness credential from a witness. The software application may be implemented as a set of instructions that are stored in some tangible storage medium associated with the client device, such as a magnetic hard drive, read-only memory (ROM) or random access memory (RAM) that is included in, or coupled to, the client device. The set of instructions may be executed by a processor associated with the client device for generating the GUI with the pages 210, 220 and 230 and enabling communication with the server.

Each of the pages 210, 220 and 230 includes a page title 212 identifying the type or content of the page. Each page also includes a credential input mechanism such as 214, 224 or 234, and associated instructions 216, 226 or 236. Input mechanism 214 includes a keypad 214a, output field 214b and a control button 214c.

In implementations where the witness credential representation is alphanumeric, the document owner may enter the credential representation onto his or her client device using the page 210. The page 210 provides an input mechanism 214 for the document owner to enter the witness credential representation. The input mechanism 214 includes an interactive input mechanism such as keypad 214a, and an output field 214b where the characters entered by the recipient using the keypad are displayed as they are entered. The characters displayed in the field 214b correspond to the witness credential representation that is received by the document owner from the witness. For example, the characters may correspond to the witness credential representation 116 shown on page 110 on the client device of the witness.

Input mechanism 214 also includes a control button 214c for selecting between a short (for example, 4-character) and long (for example, 8-character) alphanumeric credential representation. In addition to the input mechanism 214, the page 210 includes instructions 216 that explain to the document owner what is to be done.

In the example shown by page 210, the witness credential representation is an 8-digit numeric code as displayed by 214b, and the corresponding keypad 214a is a numeric keypad. However, in other implementations, the witness credential representation may be an alphanumeric string or a phrase. In such implementations, the keypad 214a may be an alphanumeric keypad and the output field 214b may display a string of letters and digits of a length that may be different from the length of the numeric code shown by the example. In addition, the control button 214c may not be present in such cases.

In implementations where the witness credential representation is an optical machine-readable representation such as QR code, the document owner may enter the credential representation onto his or her client device using the page 220. The page 220 provides an input mechanism 224 for the document owner to enter the witness credential representation along with instructions 226 that explain what is to be done. The input mechanism 224 may be a reticle corresponding to a field of view from a camera that is operatively coupled to the client device of the document owner. The reticle can be used by the document owner to assist in scanning, from the client device of the witness, the witness credential representation that is a QR code, such as credential representation 126 shown on page 120.

In implementations where the witness credential representation is an audio clip that is transferred from the witness device to the client device of the document owner as an audio signal (for example, ultrasonic sound waves), page 230 may be presented on the display of the device of the document owner providing instructions for receiving the credential representation. The page 230 includes a visual indication of the input mechanism 234 and instructions 236 that provide cues to the document owner on how to enter the credential representation into his or her device (for example, "To enter a credential, place phones in close proximity. The information will be transferred automatically."). As described previously, the representation for the witness credential may be communicated from the witness device to the document owner device via ultrasonic waves (for example, waves having frequencies greater than 20 kHz).

Once the document owner has successfully received the witness credential representation, the document owner may transfer the credential representation to the server through his or her client device, along with an electronic copy of (or a reference to) the document that is to be witnessed. In some implementations, the electronic document may already be available to the server, for example, present in storage local to the server. The electronic document may have been present in the server's local storage before any transaction related to witnessing the electronic document is executed by the server or the client devices of the witness or the document owner. Alternatively, the document owner may have uploaded the electronic document, or sent information associated with the electronic document as appropriate, to initiate the transactions for witnessing the electronic document prior to the server generating the credential representation for the witness. In such implementations, the document owner may simply send information identifying the electronic document that facilitates the locating of the electronic document in the server's local storage by the server.

When the server receives the witness' credential representation from the document owner, the server identifies the witness based on the received credential representation. After identifying the witness, the server retrieves the witness' badge (for example, from the user account associated with the witness) and embeds the badge into (or otherwise associates the badge with) the document. Thereafter, the electronic document bears indicia of having been witnessed.

Figure 3:
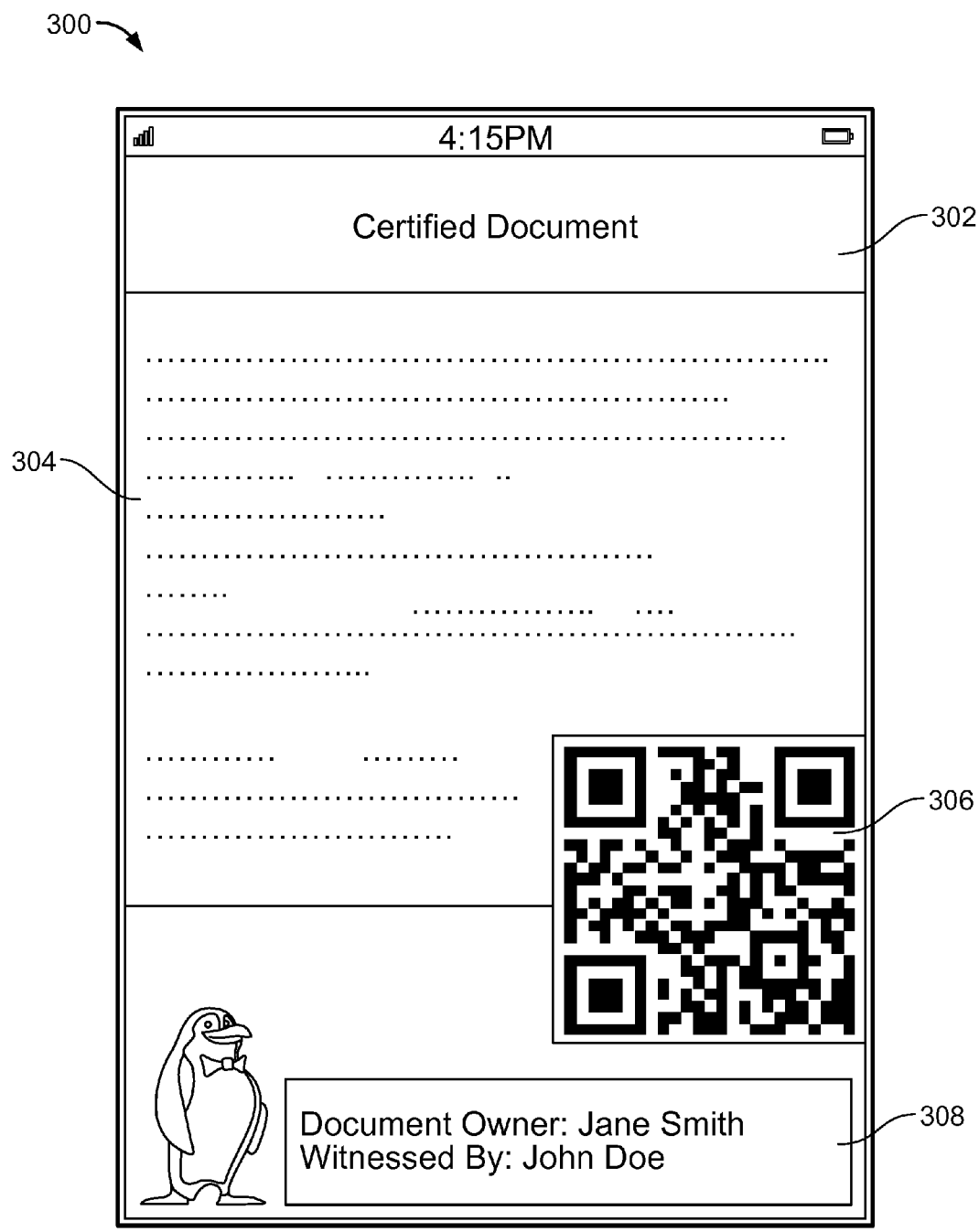
FIG. 3 illustrates an example of a page showing the representation of an electronic document embedded with a badge as an indication that the electronic document has been witnessed by the user associated with the badge.

FIG. 3 illustrates an example of a page 300 showing a representation of an electronic document 304 within which a representation of a badge 306 has been embedded as an indication that the electronic document has been witnessed by the user associated with the badge 306. The page 300 may be presented by the GUI of the client software application on the display of a client device on which the software application is executed. The client device may be, for example, the computing device used by the document owner, or another user to whom the document owner has sent the certified electronic document. The software application may be implemented as a set of instructions that are stored in some tangible storage medium associated with the client device, such as a magnetic hard drive, read-only memory (ROM) or random access memory (RAM) that is included in, or coupled to, the client device. The set of instructions may be executed by a processor associated with the client device for generating the GUI with the page 300 and enabling communication with the server.

The page 300 includes a page title 302, a representation of an electronic document 304 that is embedded with a representation of a badge 306, and additional information 308 about the certified document. The title 302 identifies the content of the page 300. In the example shown, the title 302 identifies the page 300 as displaying a certified document, which is a representation of an electronic document with an embedded badge indicating that the electronic document has been witnessed by the holder of the badge.

The representation 304 of the electronic document may be a miniature graphical representation (a "thumbnail") of the electronic document. However, for large displays, the representation 304 may be a copy of the electronic document instead of a thumbnail, with the copy being scaled to fit the dimensions of the display. In some implementations, the representation may show only a portion of the electronic document, such as a thumbnail of the first page of a textual document. In some implementations, the user may be able to scroll through multiple pages of the electronic document using the representation 304, such that, based on the user input, thumbnails or scaled copies of consecutive pages may be shown in the representation 304.

The representation of the badge 306 is an electronic seal that is tied to the identity of the person who acted as a witness in certifying the electronic document 304. The representation of the badge 306 may be associated with the user account of the witness that is maintained by the server and may include encoded information that enables the server to readily identify the associated user account. The representation of the badge 306 may be tamper-proof such that any unauthorized attempt to modify the information encoded in the badge is identified by the server. In some implementations, a user account may have multiple badges associated with the account and different badges may be configured for different uses. For example, a first badge may be used for witnessing documents, a second badge may be used only for identity verification, while a third badge may be used for sharing files electronically.

As shown in the page 300, the representation of the badge 306 may be an optical machine-readable representation, such as a QR code. However, in other implementations, the badge 306 may be in some other suitable format. For example, the badge 306 may include an alphanumeric string of characters. Alternatively, the badge 306 may include additional information about the witness. For example, the badge may include a miniaturized representation of a photograph of the witness, or a name of the witness or some other suitable identifying information, or both. In some implementations, the badge 306 may state something to the effect of "the document has been witnessed by <username>," where <username> is information identifying the witness, such as his or her user name.

The information 308 identifies the user who owns the electronic document and also identifies the user who witnessed the document. The information 308 facilitates the easy identification of the document owner and the witness by a third party user who may have received the certified electronic document. In some implementations, the information 308 may not be present. In such implementations, the third party user may obtain equivalent information about the certified document by contacting the server.

Figure 4:
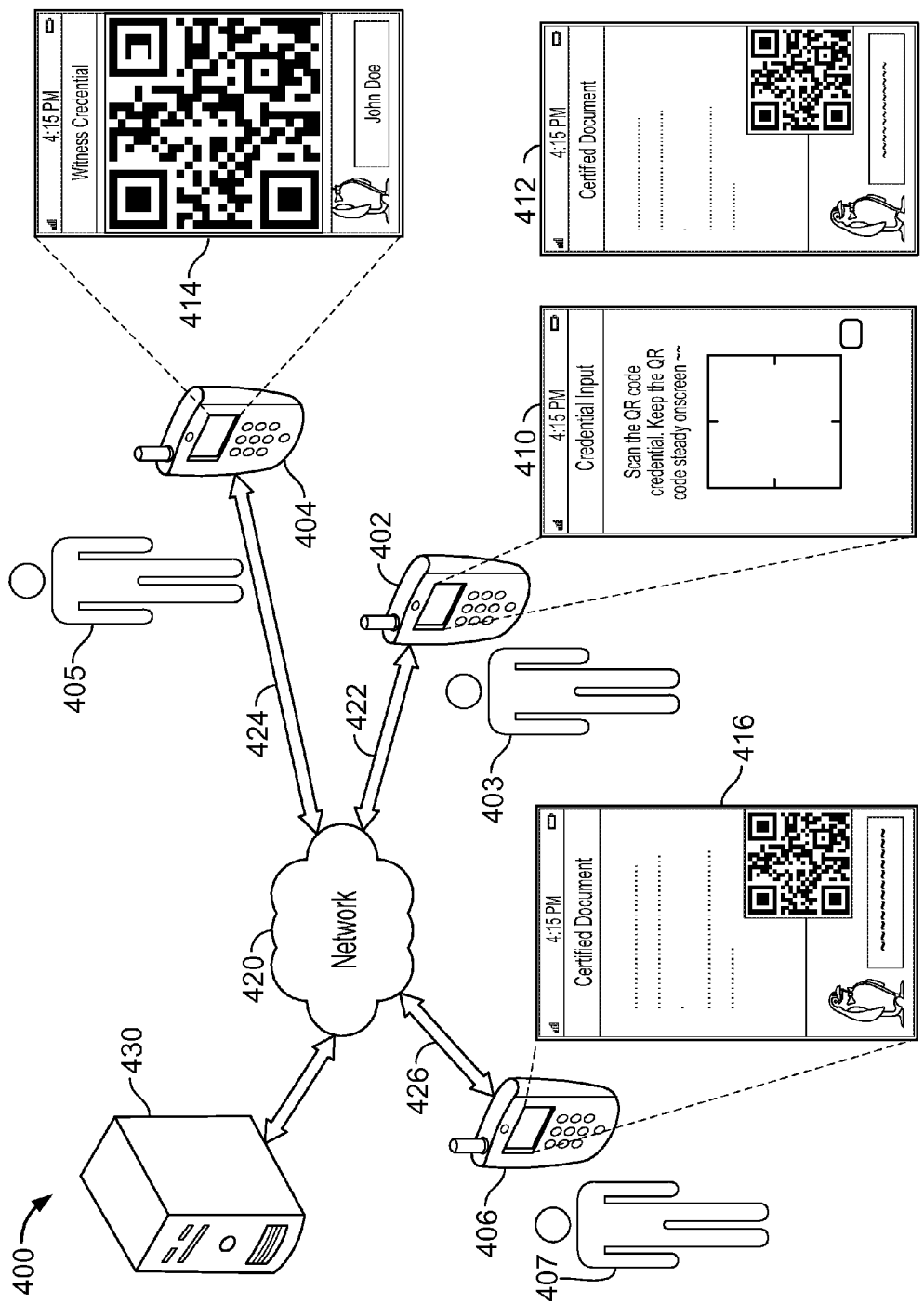
FIG. 4 illustrates an example of a system that facilitates witnessing an electronic document by client devices.

FIG. 4 illustrates an example of a system that facilitates witnessing an electronic document by client devices using a credential generated by a server. The system 400 may be used to implement the client-server application for document witnessing that is described with reference to the GUI pages 110, 120, 130, 210, 220, 230 and 300.

The system 400 includes client devices 402, 404 and 406 that are operated by users 403, 405 and 407 respectively. Client devices 402, 404 and 406 communicate with each other and with a server 430 using network connections 422, 424 and 426 respectively over a network 420. The pages 410 and 412 are displayed on client device 402, page 414 is displayed on client device 404 and page 416 is displayed on client device 406.

Each client device 402, 404 or 406 may be, for example, a mobile device such as a cellular phone, a smartphone, a tablet computer, a notebook or laptop computer, an e-book reader or a music player. Alternatively, each client device 402, 404 or 406 may be a desktop computer or any other appropriate portable or stationary computing device. Each client device 402, 404 or 406 may include one or more processors configured to execute instructions stored by a computer readable medium for performing various client operations, such as input/output, communication, data processing, software execution and the like. For example, the user 403 may be a document owner and the associated client device 402 may execute the software application for document witnessing that provides a GUI displaying the pages 210, 220 and 230 and 300 on a display coupled to the client device. User 405 may be a witness for an electronic document owned by user 403 and client device 404 associated with user 405 may execute the software application for document witnessing that provides a GUI displaying the pages 110, 120 and 130 on a display coupled to the client device. User 407 may be a third party user who receives the certified electronic document from the document owner 403, and device 406 associated with user 407 may execute the software application for document witnessing that provides a GUI displaying the page 300 on a display coupled to the client device.

The displays coupled to the client devices 402, 404 and 406 may be implemented as proximity-sensitive displays (for example, a touch screen) such that each user 403, 405 and 407 may enter information by touching or hovering a control object (for example, a finger or stylus) over the respective display. The software application may be written in any suitable programming language, for example, C, Objective-C, C++, Java, Perl, HTML, etc.

The network 420 may include a circuit-switched data network, a packet-switched data network, or any other network able to carry data, for example, Internet Protocol (IP)-based or asynchronous transfer mode (ATM)-based networks, including wired or wireless networks. The network 420 may include the Internet, Wide Area Networks (WANs), Local Area Networks (LANs), analog or digital wired and wireless networks (for example, IEEE 802.11 networks, Public Switched Telephone Network (PSTN), Integrated Services Digital Network (ISDN), and Digital Subscriber Line (xDSL)), Third Generation (3G) or Fourth Generation (4G) mobile telecommunications networks, a wired Ethernet network, a private network such as an intranet, radio, television, cable, satellite, and/or any other delivery or tunneling mechanism for carrying data, or any appropriate combination of such networks.

The network 420 may be configured to handle secure traffic such as secure hypertext transfer protocol traffic (HTTPS) or virtual private networks (VPN). In some implementations, the connections 422, 424 and 426 may be secure connections, such as using VPN or HTTPS. However, in other implementations, the connections may be unsecured connections.

The communications from the client devices may be authenticated. For example, in cases where the client devices 402, 404 and 406 are mobile devices and instances of a mobile application running on the devices are used to communicate with each other and with the server 430, the messages may be signed by the instances of the mobile application to indicate that the messages are generated by the mobile application. In addition, or as an alternative, the messages may be signed by hardware on the client devices 402, 404 and 406, such as using the physical addresses of the respective network interfaces through which the communications are transferred. By signing the messages in such manner, the messages may be authenticated as coming from the client devices 402, 404 or 406, and/or from the mobile application running on the client devices 402, 404 or 406, respectively.

The server 430 may be a single server or it may represent a collection of servers, such as a server farm or another server arrangement. In either implementation, the server 430 includes one or more processors configured to execute instructions stored by a computer-readable medium for performing various server operations, such as executing database applications for managing user accounts, badges and credentials associated with users of client devices, storing electronic documents corresponding to the user accounts, and running client-server applications for communicating with the software applications on the client devices 402, 404 and 406 for generating credentials for witnessing electronic documents and sharing certified electronic documents between the devices.

In some implementations, the server 430 may function as a credential authority, or be coupled to a credential authority. In such implementations, the server 430 may be configured to validate a representation of a credential presented by any one of users 403, 405 or 407 on his/her respective client device 402, 404 or 406 by comparing the user-presented credential representation with valid representations for the credential that are locally available to the server 430. The server 430 may validate the representation of a credential presented by user 403, 405 or 407 as a security mechanism to ensure that a user who wishes to have an electronic document certified as the document owner, or a user who wishes to act as a witness, is authorized to do so. In addition, the server 430 may generate badges that uniquely represent the identities of individual users and associate those badges with the corresponding user accounts. As described previously, a badge may be used as proof of witnessing for a certified electronic document.

In operation, the server 430 manages and stores one or more credentials and badges associated with appropriate user accounts. The server 430 also stores electronic documents that are uploaded to the server. The electronic documents may include both certified electronic documents and documents without certification. The electronic documents may be stored such that they are linked with the user accounts of the document owners. The server 430 can be any suitable computer or collection of computers executing software capable of managing, distributing, and validating credentials and badges for users and certified electronic documents via the network 420 as described herein.

Credentials, badges, user accounts, and electronic documents can be stored in a database (for example, MySQL, PostgreSQL, MS SQL Server, MongoDB), or other suitable data structure that can be accessed by the server 430. In some implementations, the server 430 may access the stored credentials and/or user accounts via web services such as representational state transfer (REST) style services.

In some implementations, the server 430 may present an interface so that users such as 403, 405 or 407 can create user accounts. For example, the server 430 may present an interactive web interface via a web browser that is executed on computing devices associated with the users 403, 405 and 407. The computing devices may be the client devices 402, 404 and 406 or other suitable machines used by users 403, 405 or 407. Alternatively, applications on the server 430 may be directly accessible via a GUI provided by a dedicated software application running on the computing devices, or an application executed on a mobile device, such as the previously-described client software application running on client devices 402, 404 or 406.

The user accounts may be stored in a table or collection of tables in a database, or in any other suitable data structure accessible by the server 430. The user accounts may include a variety of information, such as user name, user identifier (for example, a number or character string that uniquely identifies a user), and the address(es) of one or more client devices owned by or otherwise associated with the user.

In some implementations, the user accounts may be created by an entity that is different from the users linked to the user accounts. For example, a company, for example, Company A, may create user accounts for its employees and store the user accounts in the server 430 that is managed by Company A. The entity also may be the credential authority that generates and manages credentials for the user accounts. For example, Company A may generate and manage credentials and badges for the user accounts of its employees; the employees may witness electronic document and share electronic documents using badges that are based on credentials generated by the Company A, with the electronic documents and the linked credentials being managed by the server 430 that is operated by company A and/or that provides a service to Company A.

In some implementations, the user accounts may include group accounts, which may be a collection of individual user accounts that may perform certain functions using a common credential. Certain individual users may be identified as belonging to a group by linking an entry for the corresponding user account to an entry for the group account, for example by use of a linking table. The group accounts may include a variety of information such as a group name, group identifier (for example, a number or character string that uniquely identifies a group), and a description of the group.

In addition, or as an alternative, to the creation of user accounts and group accounts by entities like a company or some other suitable institution, user accounts and group accounts may be created at the request of potential users through a web-based or other interface, or through any other suitable means such as sending email or SMS to the users. In some implementations, the potential users may be able to create user accounts by use of an application running on a client device, such as the software application running on client devices 402, 404 and/or 406.

Once user accounts have been created, credentials may be generated by the server 430, or the credential authority that is linked to the server 430 (the server 430 and the associated credential authority are referred to interchangeably as the server 430), for associating with the user accounts, and to be user for witnessing electronic documents by the users corresponding to the user accounts. For example, in a manner similar to that previously described, user 403 may wish to have an electronic document witnessed by user 405. A copy of the electronic document may be stored at the server 430 a priori, or the user 403 may upload a copy of the electronic document to the server from his or her client device 402 to initiate the witnessing of the electronic document.

The user 405 uses the software application running on the client device 404 to request the server 430 to generate a representation of a credential that can be used to witness the desired electronic document. The users may interact with the server 430 through a web interface presented by the server 430 via web browsers running on the client devices, or through the software application providing a GUI that presents the page 414 on the client device 404. In some implementations, the user 405 may have pre-authorization from the server 430 to provide witnessing services for electronic documents. In such implementations, a representation of a credential that can be used for witnessing may be already stored on the client device 404, for example, based on some prior transaction between the client device 404 and the server 430. In other implementations, the user 405 may request authorization from the server 430 to provide witnessing services for electronic documents as part of sending the request to generate a representation of a credential that can be used to witness the desired electronic document.

Based on the request from the user 405, the server 430 generates a representation of a credential for user 405 that can be used to witness user 403's electronic document. The server 430 links the generated credential representation to the user account associated with user 405. In addition, in some implementations, the server also may link the credential representation with user 403's electronic document that is to be witnessed using the generated credential. This may be the case, for example, in implementations where the server generates a different credential representation for every electronic document that is to be witnessed. Therefore, in such implementations, there may exist a one-to-one correspondence between a certified electronic document and the credential representation that is used to witness the electronic document. In either case, the server transmits the generated credential representation to the client device 404.

The credential representation is presented to the user 405 using page 412 on the display of the client device 404. The page 412 may be similar to any of the pages 110, 120 and 130, depending on the type of the credential. For example, as shown, the credential representation may be a QR code and the page 412 may be similar to the page 120.

When the user 405 receives the credential representation from the server 430, the user may send the credential representation to the client device 402 associated with the document owner 403. The user 405 may transmit the credential representation as part of witnessing a copy of the electronic document, using any of the mechanisms described previously. The user 405 may witness the electronic document on the client device 402. Alternatively, the user 403 may transfer a copy of the electronic document to the client device 404 for witnessing by the user 405.

The user 403 may obtain the credential representation from the user 405 using any of the mechanisms described previously. For example, as shown, when the credential is a QR code, the user 403 may scan the credential representation with his or her client device 402 using the page 410, which may be similar to the page 220.

Once the document is witnessed by the user 405 and the credential representation is available to the user 403 on his/her client device 402, the user 403 may send the credential representation to the server 430 so that the server may generate a certified copy of the electronic document, for example, embedded with a badge of the user 403 based on the credential representation. In alternative implementations, the software application on the client device 402 may be configured to generate the certified copy of the electronic document locally without sending the credential representation to the server 430.

Referring to the implementation where the server generates the certified copy of the electronic document, the client device 402 may upload the electronic document, or some other information associated with the electronic document along with sending the credential representation, such that the server 430 may identify which electronic document is being certified using the credential. However, in implementations where the credential is uniquely associated with an electronic document as described previously, the client device 402 may not send information associated with the electronic document. In such implementations, the server 430 may identify the electronic document from the information encoded in the credential representation that is uploaded by the client device 402.

When the server 430 receives the credential representation from the client device 402, the server identifies the credential representation based on the information encoded in the credential representation. For example, the server determines that the credential is associated with user 405. In addition, in implementations where there exists a bijection between the credential and the electronic document, the server may identify the electronic document based on the information encoded in the credential.

The act of receiving a credential representation associated with user 405 from client device 402 of user 403 may imply to the server 430 that the user 405 is witnessing the electronic document indicated by the message from client device 402 that transmitted the credential representation to the server 430. However, in some implementations, the server 430 may send a message to the client device 404 to receive confirmation from user 405 that the user is indeed witnessing the particular electronic document. The confirmation received from the client device 404 may be a voice confirmation, for example, an audio clip of the user 405 saying "Yes." Alternatively, or additionally, the confirmation received from the client device 404 may be a fingerprint of the user 405.

Additionally, in some implementations, the server may authenticate the message that is received from client device 402 to confirm that the credential representation and the information corresponding to the electronic document are uploaded by the client device 402, and/or the user that is the owner of the electronic document being witnessed.

When the server 430 has determined the electronic document that is to be witnessed, and optionally, has confirmed that the user 405 intends to witness the particular electronic document, the server 430 embeds a badge associated with the user 405 in the electronic document. In some implementations, the server 430 may include a representation of the confirmation received from the client device 404 in the certified electronic document. For example, the server may append the voice confirmation or the fingerprint of the user 405 with the badge and then embed the badge within the electronic document. Including such biometric indicators may enable two-factor authentication for witnessing electronic documents, which may be useful in providing an additional level of security.

In some implementations, the certified electronic document also may be digitally signed by (or on behalf of) the user witnessing the document. In such implementations, a digital signature may be generated by generating a digest of the certified electronic document using a suitable cryptographic hashing algorithm and encrypting the digest using a private key belonging to the witness. The digital signature then may be appended to the document. The digital signature may be based on public-key infrastructure (PKI), such as Digital Signature Algorithm (DSA).

The certified electronic document may be signed by the server acting as a proxy for the witness. For example, the server 430 may store private keys of all the users and use the private key of user 405 to sign the certified electronic document, for example, after generating a digest in the manner described above. The digital signature on the certified electronic document may act as authentication that the certified electronic document was witnessed by the user whose badge is embedded within (or otherwise associated with) the electronic document. A third party, who knows the public key of the document witness, may verify the signature on the certified electronic document and therefore be assured that the electronic document was witnessed by the user identified by the embedded badge.

Once the electronic document is certified, the server stores the certified electronic document such that it is linked to the account of the user 403. In some implementations, the server also may store the badge with the certified electronic document, or store a link to the badge, for example, that may be present in the account of the user 405. In addition, or as an alternative, to storing the certified electronic document, the server may generate a digest of the certified electronic document with the embedded badge using a suitable cryptographic hashing algorithm, and store the digest in local storage associated with the user account corresponding to user 403. The server 430 also transmits a copy of the certified electronic document to the client device 402, which may then present the certified electronic document to the user 403 using the page 412.

Once the certified electronic document is available on the client device 402, the user 403 may share the certified electronic document with other users. For example, the user 403 may transmit a copy of the certified electronic document from the client device 402 to the client device 406 associated with user 407. The software application running on the client device 407 may present the copy of the certified electronic document on the display of the client device 407. A representation of the certified electronic document may be viewable on the client device 407, for example as shown by the page 416.

Subsequently, the user 407 may wish to verify that the copy of the certified electronic document is indeed witnessed by the user 405. Accordingly, the user 407 may send a request to the server 430 for verification through the client device 406. As part of the request, the client device 406 may send the copy of the certified electronic document to the server 430. Alternatively, the client device 406 may generate a digest of the certified electronic document and send the hash as part of the request. The digest may be generated using the same cryptographic hashing algorithm as used by the server 430.

Upon receiving the request from the client device 406, the server 430 identifies the document that is to be verified based on information included in the request. The server 430 then locates the certified electronic document in its local storage and compares the certified electronic document with the information sent by the client device 406. In some implementations, the server 430 compares the locally-stored digest of the certified electronic document with a digest of the electronic document that is based on the request. As described previously, the latter may be sent by the client device 406 as part of the request, or alternatively, the server 430 may generate a digest of the copy of the electronic document that is received along with the request from the client device 406.

If the server 430 determines that the two documents or the two digests match (for example, if the server 430 determines that the two documents are cryptographically identical), the server 430 sends a notification to the client device 406 confirming that the copy of the certified electronic document shown by the page 416 has been witnessed by the user 405. On the other hand, if the two documents or the two digests do not match, then the server may send an error notification to the client device 406 indicating that the copy of the certified electronic document shown by the page 416 cannot be verified as having been witnessed by the user 405.

The system 400 may be used with any file management platform to enable witnessing of electronic documents using credentials and/or other suitable codes. The file management platform may have application programming interfaces (APIs) that can be used by the system 400 to link the file management platform with the credential generation and document witnessing functionality provided by the system 400.

Figure 5:
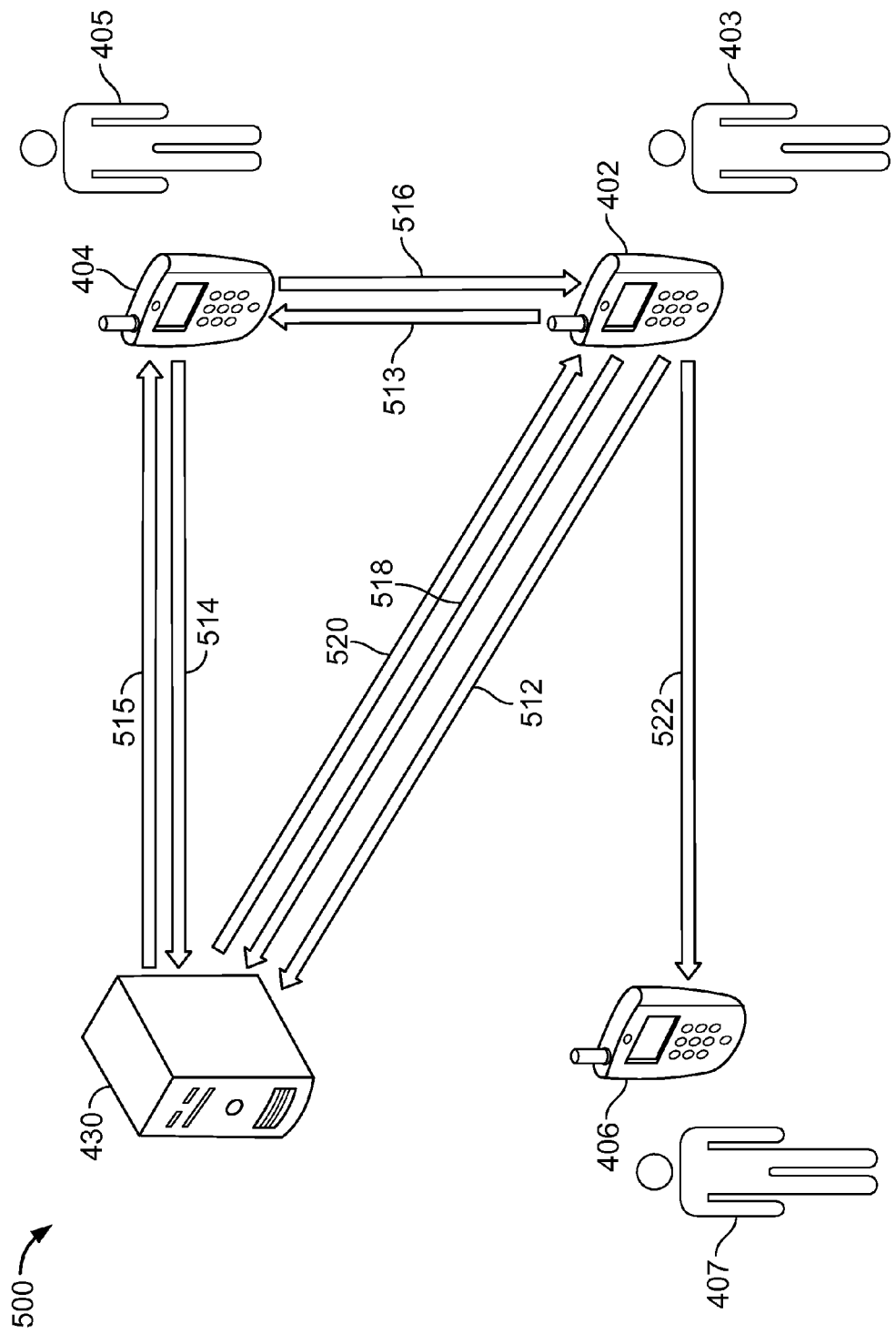
FIG. 5 illustrates an example of a flow of sample messages between client devices and a server for witnessing an electronic document using a credential, and sharing the certified electronic document among users.

FIG. 5 illustrates an example of a flow 500 of sample messages between client devices and a server for witnessing an electronic document, for example, using a credential generated by the server, and sharing the certified electronic document among users. For example, the client devices 402, 404, 406 and the server 430 may exchange the sample messages to as part of enabling the witnessing, by user 405, an electronic document associated with the user 403 based on a credential generated by the server 430. Subsequently, the user 403 may share the certified electronic document with user 407, who can verify that the electronic document was witnessed by user 405 by communicating with the server 430. The following describes the example of the flow of sample messages 500 as implemented by the system 400. However, the example of the flow of sample messages 500 also may be implemented by other systems and system configurations.

The messages described below may be transmitted via any suitable protocol, for example hypertext transfer protocol (HTTP), secure HTTP (HTTPS), or SMS. Additionally, these example messages should not be considered limiting, as any suitable mechanism for performing the functions described could be used, and the messages could be sent or received in any suitable sequence.

In the message flow 500, initially the client device 402 transmits a request message 512 to the server 430 for initiating the document witnessing process. As part of the request, the client device 402 may upload the electronic document that is to be witnessed, or send some suitable information to the server 430 such that the server may identify the electronic document present in its local storage. The message 512 also may include information indicating that the electronic document is to be witnessed by the user 405.

In some implementations, when the client device 402 uploads the electronic document to the server 430, the client device 402 digitally signs the electronic document using a private key of the user 403 of the client device 402. In such cases, if the server 430 has the sender client device 402's public key, the server 430 can verify that the sender purporting to be the client device 402 is indeed the client device 402. In some implementations, the signature on the electronic document may be based on public-key infrastructure (PKI), such as Digital Signature Algorithm (DSA).

In addition to sending the request message 512 to the server 430, or as an alternative to sending the request message 512 to the server 430, the client device 402 transmits a message 513 to the client device 404, requesting the user 405 for a credential for witnessing the electronic document. In some implementations, the user 405 may have one or more credentials locally stored on the client device 404 prior to receiving the message 513. For example, the server 430 may have generated credentials for the user 405 and transmitted them to the client device 404 at a time prior to the initiation of the message flow 500.

In some other implementations, the user 405 may not have credentials pre-stored on the client device 404. In such implementations, the client device 404 sends a credential request message 514 to the server 430 upon receiving the message 513 from the client device 402.

The server 430 generates one or more credentials that the user 405 may use for witnessing electronic documents and sends the credentials to the client device 404 in a message 515.

Once one or more credentials are locally available at the client device 404, the user 405 sends a representation of a credential to the user 403 as part of witnessing the electronic document. The credential representation may be electronically transmitted from the client device 404 to the client device 402 by message 516. Alternatively, the credential representation may be shown to the user 403, who then inputs the credential representation to the client device 402. For example, the user 405 may show an alphanumeric credential code to the user 403, who may then type the credential code into his/her device, in a manner similar to that shown by page 110. Additionally or alternatively, the user 403 may use client device 402 to scan in the user 403's QR code, or the client device 402 may receive the credential representation from the client device 404 via ultrasonic transmission or NFC.

Upon receiving the credential representation, the client device 402 transmits a message 518 to the server 430 that includes the credential representation. In addition, the message 518 may include a copy of the electronic document, or information identifying the electronic document that is to be witnessed.

Upon receiving the message 518, the server 430 identifies the witness, that is, user 405, based on information encoded in the credential representation that is included in the message 518. The server 430 also identifies the electronic document based on the message 518. In some implementations, the server 430 verifies that the credential representation is valid. For example, in cases where the credential representation is time-sensitive, the server 430 may verify whether the validity period of the credential representation has expired. Additionally, or alternatively, the server also may verify whether the credential representation is authentic (for example, whether the credential representation corresponds to a user of the application, whether the credential representation was indeed generated by the server 430, whether the credential representation has been tampered since it was created, etc.). In some implementations, the server 430 also confirms, for example, by communicating with user 405, that the user 405 is witnessing the electronic document that is identified based on the message 518.

Once the credential has been verified, the server certifies the electronic document, for example, by embedding a badge associated with user 405 within the electronic document (or by otherwise associating a badge association with user 405 with the electronic document). The server then stores the certified electronic document in local storage such that the certified electronic document is associated with the user account of user 403. As described previously, in some implementations, the server may generate a digest of the certified electronic document with the embedded badge using a suitable cryptographic hashing algorithm and store the digest in local storage such that the digest is associated with the user account corresponding to user 403.

The server 430 then transmits a copy of the certified electronic document to the client device 402 in message 520. The client device 402 may then present the certified electronic document to the user 403, for example, using the page 412.

Once the electronic document has been certified, the user 403 may share the certified electronic document with other users, for example, user 407. The user 403 may transmit a message 522, which includes a copy of the certified electronic document, from the client device 402 to the client device 406 associated with user 407.

Subsequently, the user 407 may view the copy of the certified electronic document on the display of the client device 407, for example, using page 416 that is presented by the GUI of the software application running on the client device 407. The user 407 also may verify the authenticity of the copy of the certified electronic document, for example, by communicating with the server 430 as described previously.

In some implementations, the user 407 may verify the authenticity of the copy of the certified electronic document locally on the client device 406. In such implementations, the client device 406 obtains the digest of the certified electronic document that is stored at the server 430. The client device 406 generates a digest of the certified electronic document locally using the same cryptographic hashing algorithm as used by the server 430. Then the client device 406 compares the digest received from the server 430 with the locally generated digest to determine that the copy of the certified electronic document has not been changed since it was witnessed by the user 405.

Figure 6:
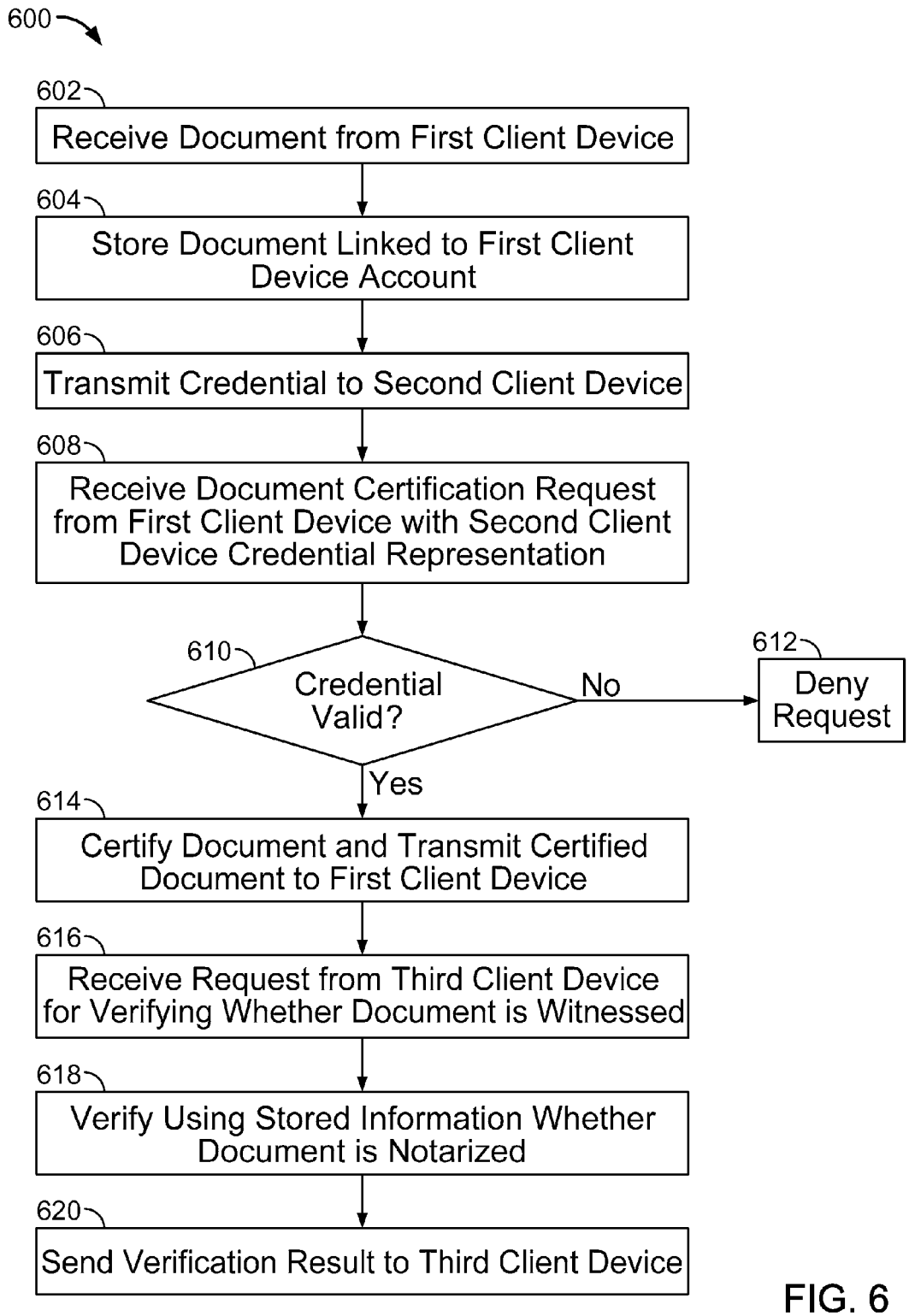
FIG. 6 illustrates an example of a process that may be used to witness an electronic document between client devices using a credential generated by a server.

FIG. 6 illustrates an example of a process 600 that may be used to witness an electronic document between client devices using a credential, for example, a credential generated by a server. For example, the process 600 may be used by client devices 402 and 404 to witness an electronic document owned by client device 402 based on a credential generated by the server 430, and subsequently the client device 402 may share the certified electronic document with client device 406. Accordingly, the following describes the process 600 as implemented by the system 400. However, the process 600 also may be implemented by other systems and system configurations.

The process 600 starts when the server receives an electronic document from a first client device (602). The electronic document may be a document that is to be witnessed and the first client device may be the document owner or some entity that controls the electronic document. As part of receiving the electronic document, the server also may receive information corresponding to the user who is to act as witness for the electronic document, along with information corresponding to a second client device associated with the user acting as the witness. For example, the client device 402 may be the first client device and the client device 404 may be the second client device. The server 430 may receive from the client device 402 the request message 512, which may include the electronic document that is to be witnessed and information indicating that the electronic document is to be witnessed by the user 405.

The server stores the electronic document such that the electronic document is linked to the user account associated with the first client device (604).

Then the server transmits a credential to the second client device (606). The credential may be generated once the request from the first client device is verified. Alternatively, the credential may have been previously generated for the user account associated with the second client device.

Subsequently, the server receives a document certification request from the first client device with a representation of the credential associated with the second client device (608). For example, the server 430 receives the message 518 from the client device 402 that includes the representation of the credential generated for the user 405. In addition, the message 518 may include a copy of the electronic document, or information identifying the electronic document that is to be witnessed.

The server determines whether the credential is valid (610). For example, upon receiving the message 518, the server 430 verifies whether the credential is valid. In implementations where the credential representation is time-sensitive, the server 430 may verify whether the validity period of the credential representation has expired. Additionally, or alternatively, the server also may verify whether the credential representation is authentic. In some implementations, the server 430 also verifies that the user 405 is intending to witness the electronic document that is identified based on the message 518.

If the server determines that the credential is not valid, the server denies the request (612). For example, after receiving the credential representation from the server 430, the user 405 may have delayed in sending the credential representation to the user 403. Alternatively, the user 403 may have delayed in sending the document certification request to the server, such that the time window for the credential has expired. As another example, the server determines that the credential has been tampered with since it was generated, or the user 405 denies, based on a query from the server, that the user intended to witness the electronic document indicated in the document certification request. In any such event, the server refuses to certify the electronic document. In some implementations, the server sends an error notification to the client device 402 indicating that the electronic document cannot be witnessed using the credential presented in the document certification request.

On the other hand, if the server determines that the credential is valid, the server certifies the electronic document and transmits the certified electronic document to the first client device (614). For example, if the credential is verified, the server 430 certifies the electronic document associated with user 403 by embedding a badge associated with user 405 within the electronic document (or by otherwise associating a badge corresponding to the user 405 with the electronic document). The server then stores the certified electronic document in local storage such that the certified electronic document is associated with user account of user 403. As described previously, in some implementations, the server may generate and store a digest of the certified electronic document linked to the user account corresponding to user 403. The server 430 then transmits a copy of the certified electronic document to the client device 402, for example, in message 520.

Subsequently, the server receives a request from a third client device for verifying whether the electronic document is witnessed (616). For example, the server 430 may receive a request from the user 407 via the client device 406 seeking to verify the authenticity of the copy of the certified electronic document that is available on the client device 406.

The server then verifies using stored information whether the document is witnessed (618). For example, upon receiving the request from the client device 406, the server 430 compares the locally-stored digest of the certified electronic document with a digest that is based on the information included in the request.

The server then sends the verification result to the third client device (620). For example, upon comparing the two digests, the server 430 may determine that the digests match. Then the server 430 may send a notification to the client device 406 confirming that the copy of the certified electronic document available on the client device 406 has been witnessed by the user 405. On the other hand, if the server determines that the two digests do not match, then the server may send an error notification to the client device 406 indicating that the copy of the certified electronic document available on the client device 406 cannot be verified as having been witnessed by the user 405.

As described above, an electronic document may be witnessed and a verifiable certified copy of the electronic document may be disseminated to various users using the system 400. In some implementations, upon sending the confirmation to the third client device, the server also may send a notification to the first client device informing the document owner that the certified electronic document was successfully verified by the recipient.

Several applications are possible based on the subject matter described above. For example, electronic documents can be witnessed using software applications running on client devices that can communicate with a credential management system, such as that provided by the server 430. In addition, a copy of the certified electronic document can be verified by another client device by communicating with the credential management system. The witnessing of the electronic document may be used to provide an added layer of security in verifying the authenticity of electronic documents. The witness functionality may be limited within certain groups of users, such as employees of a company.

The features described can be implemented in digital electronic circuitry, in computer hardware, firmware, software, or in combinations of them. The apparatus can be implemented in a computer program product tangibly embodied in an information carrier, for example, in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touchscreen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A method comprising:
    receiving, at a server and from a first client device associated with a first user, a request to attach, to an electronic document associated with the first user, a badge as certification that a second user has witnessed the document, the request including information about the electronic document along with a representation of a credential issued to the second user;
    determining, by the server, whether the received representation of the credential is a valid representation of the credential that was issued to the second user and that was used for witnessing the document;
    responsive to determining that the received representation of the credential is valid, attaching, by the server, a badge to the electronic document, the badge corresponding to the credential issued to the second user and certifying that the second user has witnessed the electronic document; and
    storing, at the server, information corresponding to the electronic document with the attached badge.

2. The method of claim 1, wherein receiving the request comprises:
    receiving, at the server and from the first client device, a copy of the electronic document for uploading to the server.

3. The method of claim 1, wherein the electronic document is stored at the server prior to receiving the request, the method comprising:
    storing, at the server, the electronic document on behalf of the first user;
    receiving, at the server and from the first client device, an access request on behalf of the first user for accessing the electronic document; and
    responsive to receiving the access request, transmitting a copy of the electronic document to the first client device.

4. The method of claim 1, wherein the representation of the credential is one of an optical machine-readable representation, an alphanumeric string, a phrase or a sonic code.

5. The method of claim 1, wherein determining whether the received representation of the credential is valid comprises:
    identifying, by the server, the second user based on information associated with the representation of the credential; and
    determining, by the server, whether the information associated with the representation of the credential matches information stored at the server associated with the second user.

6. The method of claim 5, further comprising:
    based on determining that the information associated with the representation of the credential matches information stored at the server associated with the second user, transmitting, by the server, a query to a second client device associated with the second user, the query seeking verification from the second user for certifying the electronic document;

receiving, at the server and from the second client device, a response to the query;

determining, by the server, whether the response provides verification from the second user for certifying the electronic document; and based on determining that the response provides verification from the second user for certifying the electronic document, attaching, by the server, the badge to the electronic document.

7. The method of claim 1, wherein determining whether the received representation of the credential is valid comprises:

determining, by the server, whether the credential provides authorization to the second user for certifying the electronic document as a witness.

8. The method of claim 1, wherein storing information corresponding to the electronic document with the attached badge comprises:

storing, by the server, the electronic document with the attached badge in association with at least one of an identifier for the electronic document, an identifier for the first user, an identifier for the second user, and the representation of the credential.

9. The method of claim 1, wherein storing information corresponding to the electronic document with the attached badge comprises:

generating, by the server, a message digest by hashing the document with the attached badge; and storing, by the server, the message digest.

10. The method of claim 1, further comprising:

receiving, at the server, a request from a third client device for confirming integrity of the electronic document, the request including a first message digest of the electronic document with the attached badge;

determining, by the server, whether the first message digest is a match with a second message digest of the electronic document with the attached badge, the second message digest generated by the server; and based on determining that the first message digest is a match with the second message digest, transmitting, by the server, a confirmation message to the third client device, the confirmation message confirming the integrity of the electronic document.

11. The method of claim 10, wherein the second message digest is generated by the server responsive to receiving the request from the third client device.

12. The method of claim 10, wherein confirming the integrity of the electronic document includes confirming that the second user has witnessed the electronic document.

13. The method of claim 10, wherein the third client device is configured for receiving the electronic document with the attached badge from the first client device.

14. The method of claim 1, further comprising:

receiving, at the server, a request from a third client device for confirming integrity of the electronic document, the request including information associated with the electronic document and the representation of the credential;

identifying, by the server, the badge attached to the electronic document based on the information included in the request from the third client device; and transmitting, by the server, the electronic document along with the attached badge to the third client device.

15. The method of claim 14, wherein confirming the integrity of the electronic document includes confirming that the second user has witnessed the electronic document.

16. The method of claim 1, wherein receiving the request from the first client device associated with the first user comprises:

displaying, by the first client device and on a first user interface running on the first client device, the electronic document; and responsive to displaying the electronic document on the first user interface, receiving, by the first client device, the representation of the credential from a second client device associated with the second user.

17. The method of claim 16, wherein receiving the representation of the credential from the second client device comprises one of:

receiving the representation of the credential through a user input on the first client device based on the representation of the credential being displayed on a second user interface running on the second client device, scanning, by the first client device, the representation of the credential based on the representation of the credential being displayed on the second user interface, or receiving, by the first client device and from the second client device, a network transmission including the representation of the credential.

18. The method of claim 17, wherein the network transmission that includes the representation of the credential is one of an ultrasonic transmission, a near field communication (NFC) transmission or a wireless fidelity (Wi-Fi) transmission.

19. The method of claim 1, wherein the credential is issued to the second user by the server and configured to be used for witnessing electronic documents.

20. The method of claim 19, wherein the representation of the credential is sent to the first client device from a second client device associated with the second user when the second user witnesses the electronic document.

21. A method comprising:

storing, at a server, an electronic document associated with an account of a first user;

receiving, at the server and from a first client device associated with the first user, an access request for accessing the electronic document;

responsive to receiving the access request, determining, by the server, whether the first client device is associated with the account of the first user;

based on determining that the first client device is associated with the account of the first user, transmitting the electronic document to the first client device;

receiving, at the server and from the first client device, a request to certify that the electronic document has been witnessed by a second user, the request including a representation of a credential issued to the second user;

determining, by the server, whether the received representation of the credential that was used for witnessing the document is associated with an account of the second user;

based on determining that the received representation of the credential is associated with the account of the second user, attaching, by the server, a badge to the electronic document, the badge corresponding to the credential and certifying that the second user has witnessed the electronic document; and storing, at the server, information corresponding to the electronic document with the attached badge.

22. A system comprising:

one or more processors associated with a server; and instructions stored in a machine-readable medium for execution by the processor that, when executed, are configured to cause the one or more processors to perform operations comprising:

receiving, from a first client device associated with a first user, a request to attach, to an electronic document associated with the first user, a badge as certification that a second user has witnessed the electronic document, the request including information about the electronic document along with a representation of a credential issued to the second user;

determining whether the received representation of the credential is a valid representation of the credential that was issued to the second user and that was used for witnessing the document;

responsive to determining that the received representation of the credential is valid, attaching a badge to the electronic document, the badge corresponding to the credential issued to the second user and certifying that the second user has witnessed the electronic document; and storing information corresponding to the electronic document with the attached badge.

\* \* \* \* \*